(12) United States Patent
Kim et al.

(10) Patent No.: US 8,209,260 B2
(45) Date of Patent: Jun. 26, 2012

(54) METHOD AND APPARATUS FOR OBTAINING EXTERNAL CHARGED CONTENT IN UPNP NETWORK

(75) Inventors: Jeong-ja Kim, Suwon-si (KR); Young-goo Ko, Anyang-si (KR); Sang-sun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1012 days.

(21) Appl. No.: 11/647,174

(22) Filed: Dec. 29, 2006

(65) Prior Publication Data

US 2007/0156447 A1 Jul. 5, 2007

(30) Foreign Application Priority Data

Jan. 2, 2006 (KR) .................. 10-2006-0000158

(51) Int. Cl.
*G06F 21/00* (2006.01)
(52) U.S. Cl. ............ 705/51; 705/52; 705/53; 705/54; 705/55; 705/56; 705/57; 705/58; 705/59
(58) Field of Classification Search ............ 705/51–59
See application file for complete search history.

(56) References Cited

U.S. PATENT DOCUMENTS

| 6,012,044 | A | * | 1/2000 | Maggioncalda et al. ... 705/36 R |
| 6,064,977 | A | * | 5/2000 | Haverstock et al. ............. 705/9 |
| 6,226,618 | B1 | * | 5/2001 | Downs et al. ................... 705/51 |
| 2002/0046353 | A1 | | 4/2002 | Kishimoto |
| 2002/0138325 | A1 | | 9/2002 | Mashimo et al. |

FOREIGN PATENT DOCUMENTS

| EP | 0843449 A2 | 5/1998 |
| EP | 1437696 A1 | 7/2004 |
| GB | 2378563 A | 12/2003 |
| JP | 3-92951 A | 4/1991 |
| JP | 2002-064483 A | 2/2002 |
| JP | 2002-279113 A | 9/2002 |
| JP | 2005-196564 A | 7/2005 |
| KR | 10-2004-0055450 | 6/2004 |
| KR | 10-2005-0059805 A | 6/2005 |

(Continued)

OTHER PUBLICATIONS

ContentDirectory:1 Service Template Version 1.01 for UPnP™ Version 1.0 ("UPnP") (http://www.upnp.org/specs/av/upnp-av-contentdirectory-v1-service.pdf) (Date: Jun. 25, 2002).*

(Continued)

*Primary Examiner* — Calvin Loyd Hewitt, II
*Assistant Examiner* — Cristina Owen Sherr
(74) *Attorney, Agent, or Firm* — Sughrue Mion, PLLC (57) ABSTRACT

An apparatus and method capable of purchasing external charged content in a UPnP network are provided. A media server (MS) provides a media renderer (MR) with a URL that executes a CGI that that performs purchasing of a charged content included in an external server, and, if the MR requests the reproduction of content corresponding to the URL, the MS executes a CGI of the URL, purchases charged content corresponding to the URL, and downloads the charged content, thereby browsing a list of contents provided by an external contents purchase site through a consumer electronic device such as a digital television, in which a UPnP audio/visual control point is mounted without a separate interface, purchasing desired content, and reproducing the purchased content.

13 Claims, 13 Drawing Sheets

FOREIGN PATENT DOCUMENTS

| KR | 10-2005-0077672 A | 8/2005 |
|---|---|---|
| KR | 10-2005-0088851 | 9/2005 |
| WO | 2004/077267 A2 | 9/2004 |
| WO | 2004/107669 A1 | 12/2004 |

OTHER PUBLICATIONS

Anonymous. "Method for providing end-to-end consumer multimedia content protection over the Internet to the home." IP.COM Journal, pp. 1-3, New York, Nov. 2001.

Ritchie et al. "UPnP AV Architecture: 0.83" Design Document Microsoft, Jun. 2002, pp. 1-22.

"Overview of UPnP AV Architecture" Jul. 2003, pp. 1-9.

Kang et al. "UPnP AV Architectural Multimedia System with an OSGi platform." Consumer Electronics 2004, pp. 442-446, New Jersey.

Communication dated Jul. 26, 2011, issued by the Japanese Patent Office in counterpart Japanese Patent Application No. 2006-348436.

* cited by examiner

```
<DIDL-Lite xmlns:dc="http://purl.org/dc/elements/1.1/"
xmlns:upnp="urn:schemas-upnp-org:metadata-1-0/upnp/"
xmlns="urn:schemas-upnp-org:metadata-1-0/DIDL-Lite/"/>

<item id="101" parentID="1" restricted="false">
<dc:title> [Beatles]Yesterday-LISTENING TO SAMPLES </dc:title>
<dc:creator> sidus </dc:creator>
<upnp:class>object.item.audioItem.musicTrack</upnp:class>
<res protocolInfo="http-get:*:audio/mpeg:*">
http://www.mp3store.co.kr/getcontent?contentID="101"
</res>
</item>

<item id="102" parentID="1">
<dc:title> [Beatles]Yesterday-PURCHASING </dc:title>
<dc:creator> MP3 Store </dc:creator>
<upnp:class> object.item.audioItem.musicTrack </upnp:class>
<res protocolInfo="http-get:*:audio/mpeg:*">
http://10.253.22.87/buy.cgi?id="101"
</res>
</item>
...

</DIDL-Lite>
```

METHOD AND APPARATUS FOR OBTAINING EXTERNAL CHARGED CONTENT IN UPNP NETWORK

CROSS-REFERENCE TO RELATED PATENT APPLICATION

This application claims priority from Korean Patent Application No. 10-2006-0000158, filed on Jan. 2, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to a home network, and more particularly, to obtaining external digital content in a Universal Plug and Play (UPnP) network.

2. Description of Related Art

A home network in which home devices are networked via a communication network such as mobile communication, high speed Internet, etc. can provide users of the home network a variety of services regardless of the time a user accesses a service, the location of the user, or the type of home devices, and can increase user convenience with the use of an interworking service.

A user can purchase (download) digital contents such as movies, music, comics, etc., through on-line sites providing the digital contents via a high speed communication network infrastructure, store the digital contents in a home server, and reproduce the digital contents via a rendering device such as a digital TV, an audio device, etc., using a home network system that primarily provides home entertainment.

Figure 1:
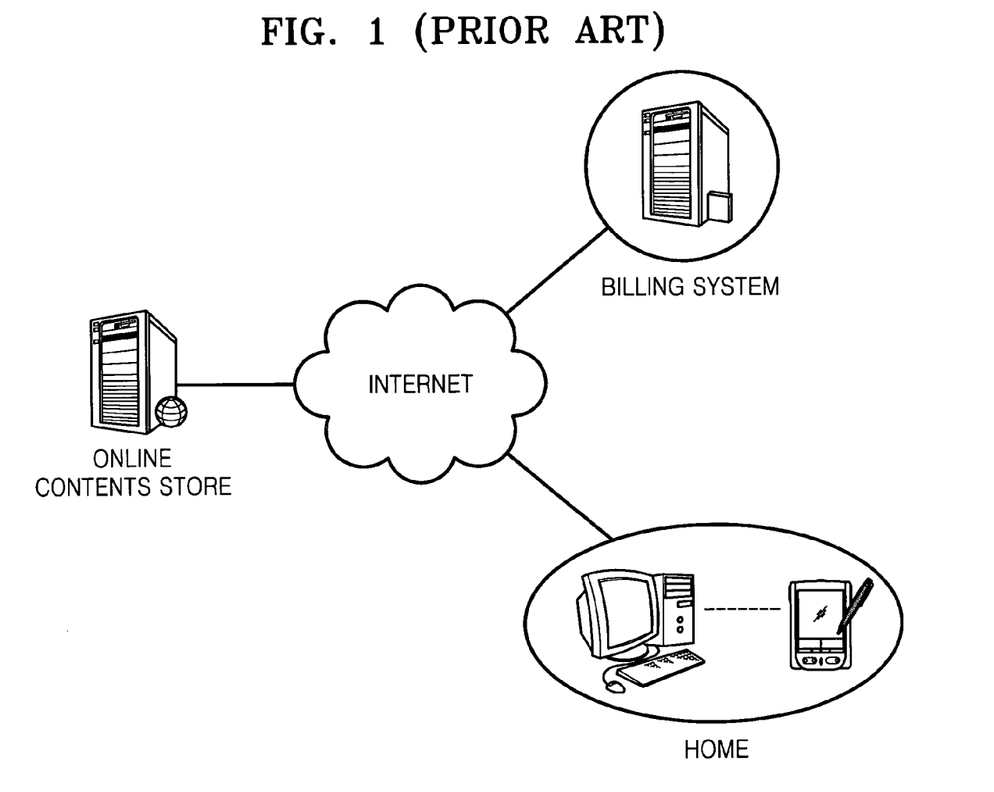
FIG. 1 is a diagram for explaining a related art method of purchasing contents from an Internet site in a home network.

FIG. 1 is a diagram illustrating a related art method of purchasing contents from an Internet site in a home network. Referring to FIG. 1, a user, using a device capable of downloading contents such as a Personal Computer (PC), WiFi-Phone, etc., logs on to the Internet site that sells contents, browses content available on the Internet site, and purchases/downloads desired content. At this time, the user can pay the Internet site for the desired contents using a third billing system, a cellular phone, cyber money, etc.

Owing to developments in home network technology, a user can reproduce the downloaded digital content using any rendering device of the home network, and copy the downloaded digital content to a mobile device such as an MPEG-1 Audio Layer 3 (MP3) player, etc.

However, when the user browses contents to be reproduced using a consumer electronics (CE) device such as a digital television (TV) and there is no desired content on the CE device that the user wishes to reproduce, the user must purchase (download) content using a device, such as a PC, in order to be connected to an external Internet site.

Specifically, if the content that is reproduced by the CE device such as the digital TV in a home network based on a UPnP framework is not local content but external charged content provided by the external Internet site, since a content reproducing device and a content purchasing device are separate from each other, the user must purchase the content via an interface such as the PC.

In this regard, a UPnP media server software (S/W) capable of interworking with an external Internet site through the CE device in a home network, and a UPnP media server capable of purchasing content is suggested. A method that browses a contents list of online stores selling digital contents through a CE device such as the digital TV and allows the purchase of a desired content is required.

SUMMARY OF THE INVENTION

The present invention provides an apparatus and method capable of purchasing an external charged content in a UPnP network and providing a UPnP media renderer with the external charged content.

According to an aspect of the present invention, there is provided a method of obtaining external content in a UPnP network, the method comprising: receiving a request from a UPnP media renderer (MR) to transmit predetermined charged content existing in an external server; performing a process of purchasing the charged content based on the request; and receiving the successfully purchased charged content from the external server.

The method may further comprise: providing a UPnP control point with a Uniform Resource Locator (URL) that triggers a Common Gate Interface (CGI) performing the process of purchasing the charged content, wherein, in the receiving the request, an Audio Visual Transportation Play (AVT::Play( )) call message including the URL is received from the UPnP MR.

The URL may be included in a response message to a Content Director Service Browse (CDS::Browse( )) call of the UPnP control point and is provided to the UPnP control point, and in a <res> tag of the response message.

In the performing the process of purchasing the charged content, user information for authenticating membership may be transmitted to the external server to pay for the charged content using reserved points by members.

A computer readable recording medium having embodied thereon a computer program for implementing the method.

According to another aspect of the present invention, there is provided an apparatus for obtaining an external content in a UPnP network, the apparatus comprising: a CGI module performing a process of purchasing predetermined charged content using a predetermined CGI, based on a request from a UPnP MR to transmit the charged content existing in an external server; and a content receiver receiving the successfully purchased charged content from the external server.

The apparatus may further comprise: a URL providing unit providing a UPnP control point with a URL that triggers a CGI, wherein the CGI module receives an AVT::Play( ) call message including the URL from the UPnP MR as a request for transmission of the charged content.

The URL providing unit may provide the URL included in a response message to a CDS::Browse( ) call of the UPnP control point to the UPnP control point.

The URL may be included in a <res> tag of the response message.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 2A:
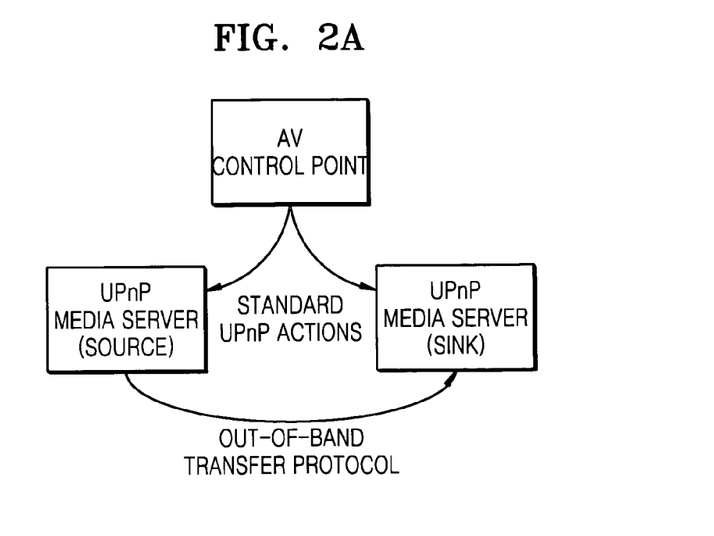
FIG. 2A is a diagram for explaining a UPnP architecture model.

FIG. 2A is a diagram for explaining a UPnP architecture model. Referring to FIG. 2A, a UPnP audio visual (AV) device abiding UPnP standards comprises a UPnP media server (MS) that serves as a content source, and a UPnP media renderer (MR) that serves as a sink.

The UPnP MS is mounted in a platform that stores media contents, extracts metadata of the media content, forms a list of metadata in the form of Digital Item Declaration Language (DIDL-Lite), manages the list, and provides an AV control point (CP) that controls the UPnP AV device with the list. The UPnP MS can obtain contents from an external data source and transmit the content to another external UPnP MS. The UPnP MS provides a content director service (CDS) that is a browsing service of a contents list, a connection manager service (CMS) that manages the connection to the UPnP device, and an AV Transport service (AVT) that controls the reproduction of contents, which are defined in the form of a UPnP action and called by the AV CP.

The UPnP MR reproduces contents, provides a CMS and AVT service like the UPnP MS does, and provides a rendering control service (RCS) relating to the settings (brightness, volume, etc.) of a device. The UPnP MS and the UPnP MR can transmit media contents via a protocol other than the UPnP such as IEEE 1394, HTTP, etc. but the protocol must be previously agreed upon by two devices in a UPnP network.

Figure 2B:
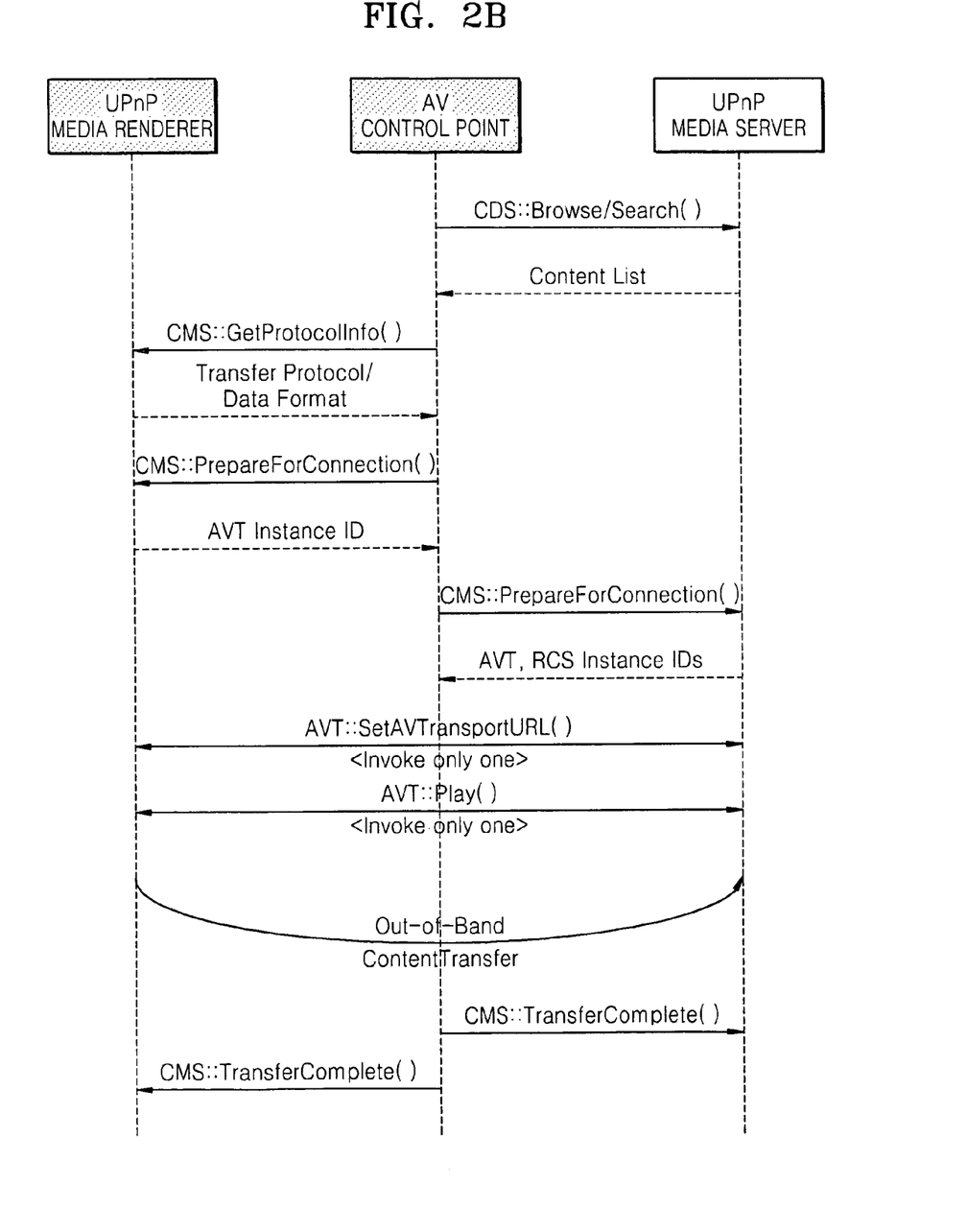
FIG. 2B is a flowchart illustrating a content reproducing process in a UPnP network.

FIG. 2B is a flowchart illustrating a content reproducing process in a UPnP network. Referring to FIG. 2B, an AV CP calls a CDS::Browse/Search( ) Action provided by a UPnP MS, obtains a list of media contents to be reproduced, and, if a user selects contents to be reproduced through a user interface (UI), receives information about a transmission protocol and a data format through a CMS::GetProtocolInfor( ) Action of the UPnP MR.

Thereafter, the AV CP calls a CMS::PrepareForConnection( ) function to attempt the connection between an MS and an MR, generates new Connection identification (ID), AV Transport ID, and RCS ID, sets a URL of content to be reproduced in the AV Transport ID through AVT::SetAVTransportURL( ), and starts reproducing the content through AVT::Play( ) Action.

When such a control process is completed in a UPnP level, the MS transmits the content to be reproduced to the MR in the form of streaming, and the MR that received the content reproduces the content. When the MR completely reproduces the content, a UPnP AV CP removes the Connection ID, the AV Transport ID, and the RCS ID through CMS::TransferComplete( ) Action.

Figure 3:
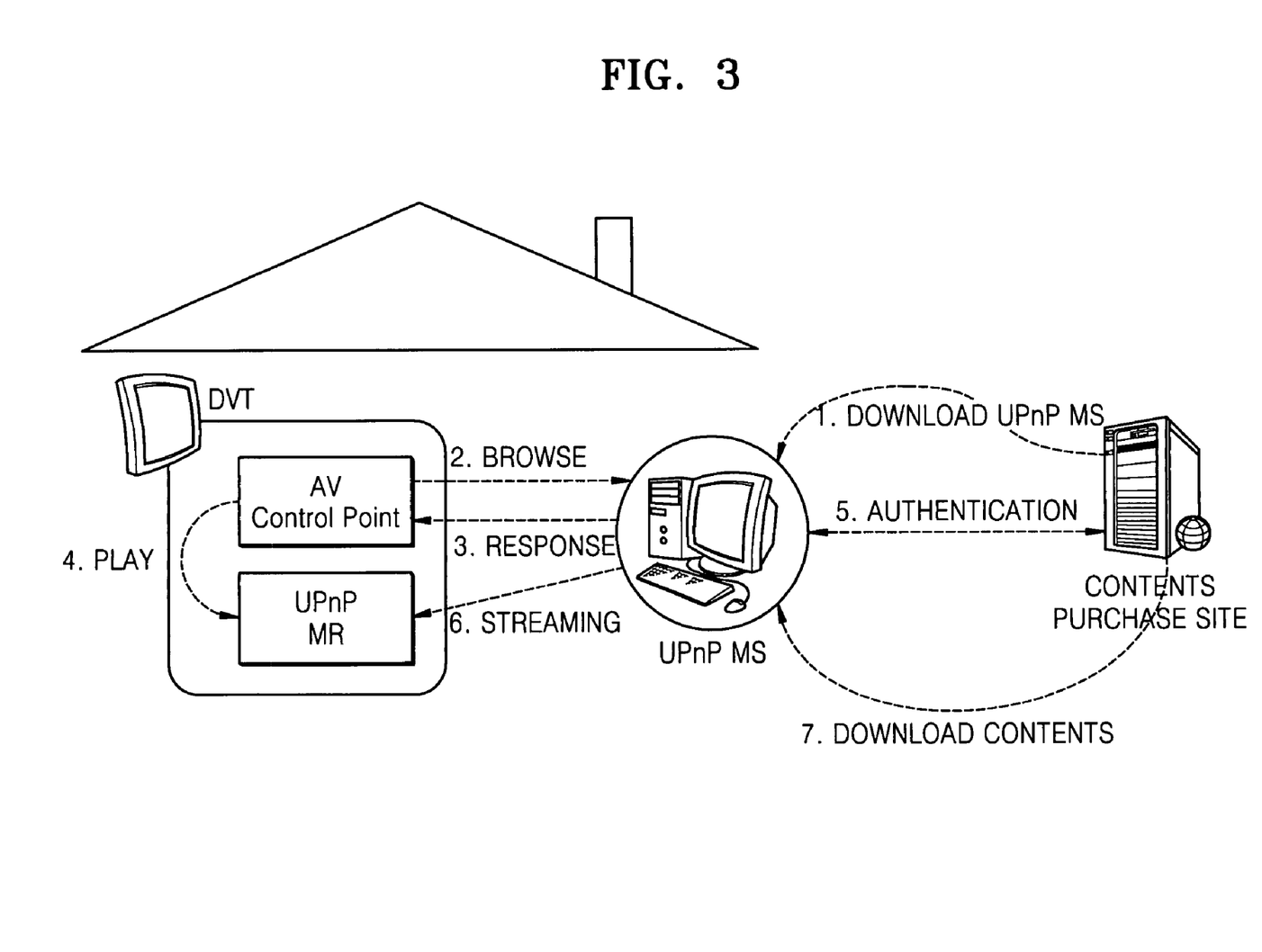
FIG. 3 is a diagram for briefly explaining a method of obtaining external charged content in a UPnP network according to an exemplary embodiment of the present invention.

FIG. 3 is a diagram for briefly explaining a method of obtaining an external charged content in a UPnP network according to an exemplary embodiment of the present invention. Referring to FIG. 3, a user downloads UPnP MS software (1) from an online content purchase site, and installs the UPnP MS software in a home network device. An AV control point and a UPnP MR are mounted in a digital TV. When the user attempts to browse (2) a list of contents to be provided by a UPnP MS using the digital TV, the UPnP MS responds with a list of contents (3) stored therein and a list of contents to be purchased from the online content purchase site, since the online content purchase site provides the UPnP MS software.

When the user requests the reproduction of the contents (4) stored in the online content purchase site by using the digital TV, the UPnP MS logs on to the online content purchase site via a member authentication process (5), pays for the charged content using reserved points, and downloads the charged content (7). If a log-in fails, a payment fails, or downloading starts or ends, the UPnP MS respectively transmits a message indicating the log-in failure, the payment failure, or the start or end of downloading to the UPnP MR in the streaming (6), and respectively informs the user of the log-in failure, the payment failure, or the start or end of downloading.

Figure 4:
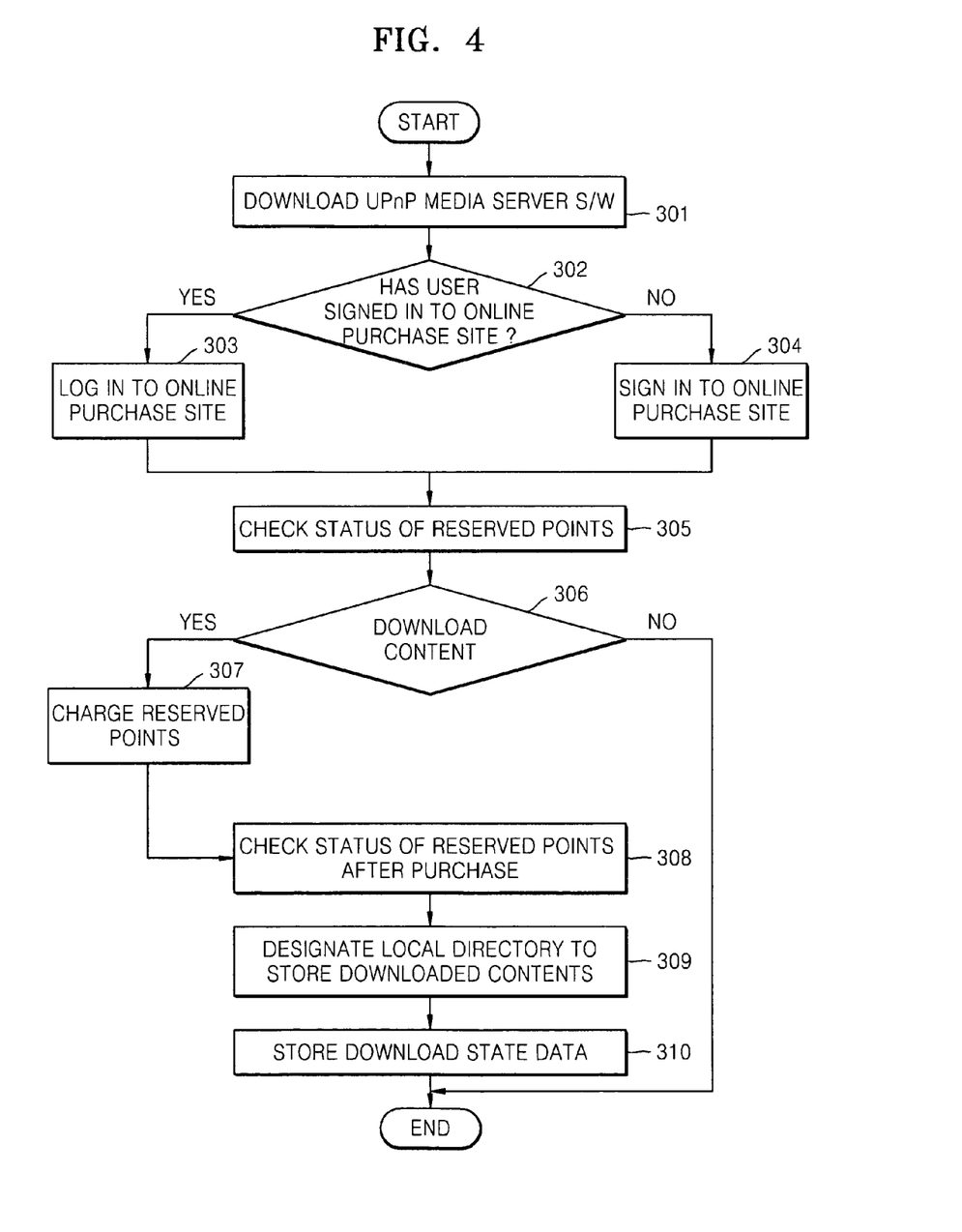
FIG. 4 is a flowchart illustrating a method of installing a UPnP media server (MS) according to an exemplary embodiment of the present invention.

FIG. 4 is a flowchart illustrating a method of installing a UPnP MS according to an embodiment of the present invention. Referring to FIG. 4, a user logs on to an online purchase site using a home network device, downloads UPnP MS software (Operation 301), the UPnP MS determines whether the user has signed in to the online purchase site (Operation 302), and, if the user has not signed in to the online purchase site, proceeds with the signing up (Operation 304). Otherwise, if the user has already signed on to the online purchase site, the user is logged into the purchase site (Operation 303). The user checks his reserved points used to purchase contents from the online purchase site (Operation 305), charges his reserved points as occasions demand (Operations 306 and 307) such as downloading desired content, checks status of reserved points after a purchase (Operation 308), designates a local directory to store downloaded contents (Operation 309), and sets a basic environment such as storing downloading contents (Operation 310), thereby completely installing the UPnP MS. The downloading contents contain data for indicating an error message as discussed above or a guide message according to a download procedure state.

Figure 5:
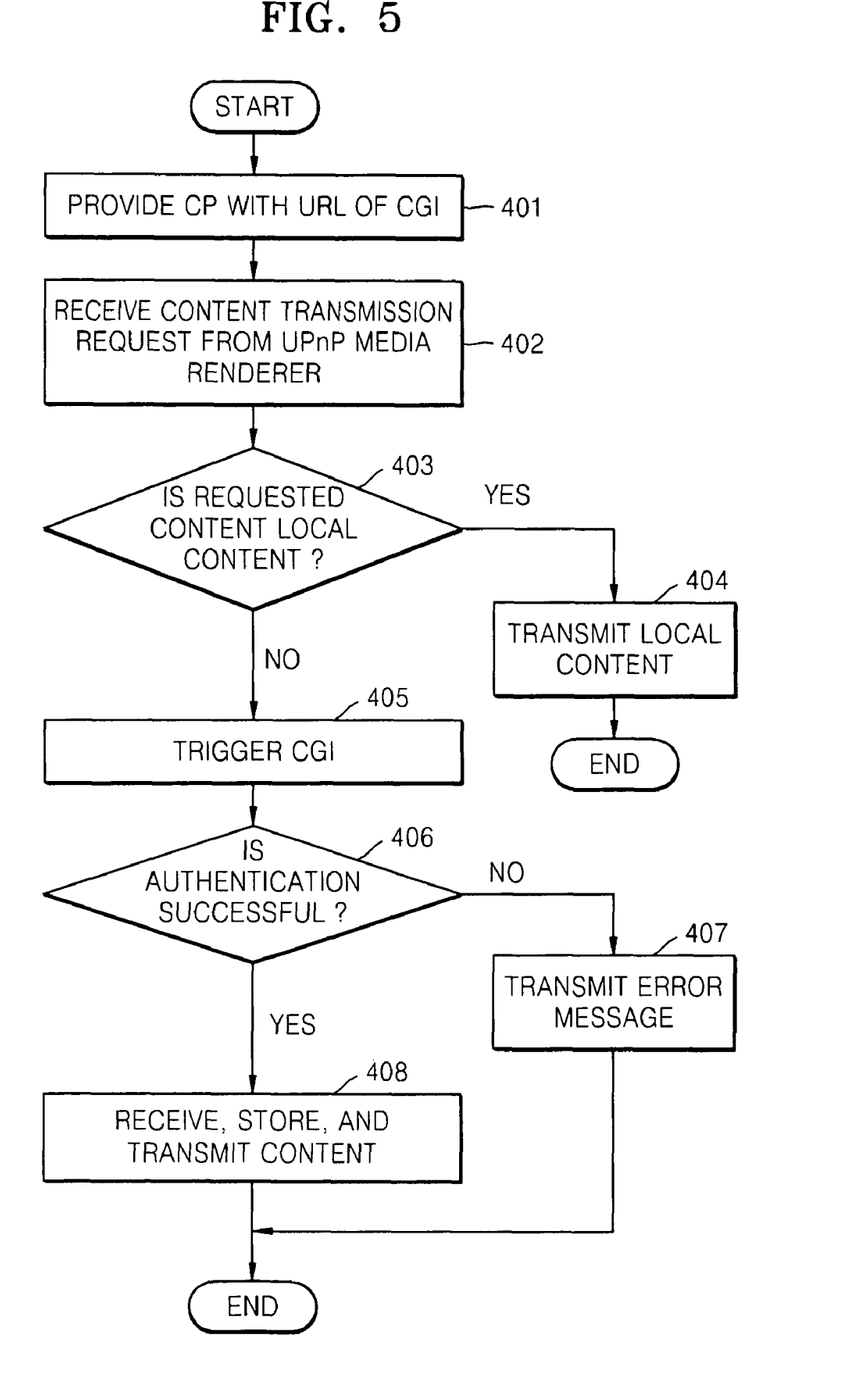
FIG. 5 is a flowchart illustrating a method of obtaining an external charged content according to an exemplary embodiment of the present invention.

FIG. 5 is a flowchart illustrating a method of obtaining an external charged content according to an exemplary embodiment of the present invention. Referring to FIG. 5, a UPnP MS comprises a common gateway interface (CGI) that executes a purchase processing procedure of the charged content from an online purchase site and a URL used to listen to samples. If a control point calls CDS::Browse( ), the UPnP MS provides the control point with URLs of CGIs that execute a purchase of each of the charged contents and the URL used to listen to samples (Operation 401). When a user selects the reproduction of a specific content through a user interface of the control point, the control point transmits a URL of the content to a UPnP MR, and the UPnP MR requests the UPnP MS to transmit the content stored in the URL received from the control point during streaming (Operation 402).

The UPnP MS determines whether the content is local content based on the URL of the content requested to be transmitted (Operation 403), and, if the content is the local content, transmits the content to the UPnP MR (Operation 404). If the content is not the local content, i.e., the URL is not in the form of the location of a specific content but in the form of triggering the CGI, the UPnP MS executes the CGI (Operation 405), performs an authentication on the online purchase site, and if the authentication is successful (Operation 406), receives and stores the content, and transmits the stored contents to the UPnP MR (Operation 408). If the authentication fails or reserved points run short, a message indicating the authentication failure or shortage of the reserved points is transmitted to the UPnP MR (Operation 407). In the case where the URL is used to listen to samples, content of the URL is received and provided to the UPnP MR. In this case, the authentication process can be omitted.

Figure 6:
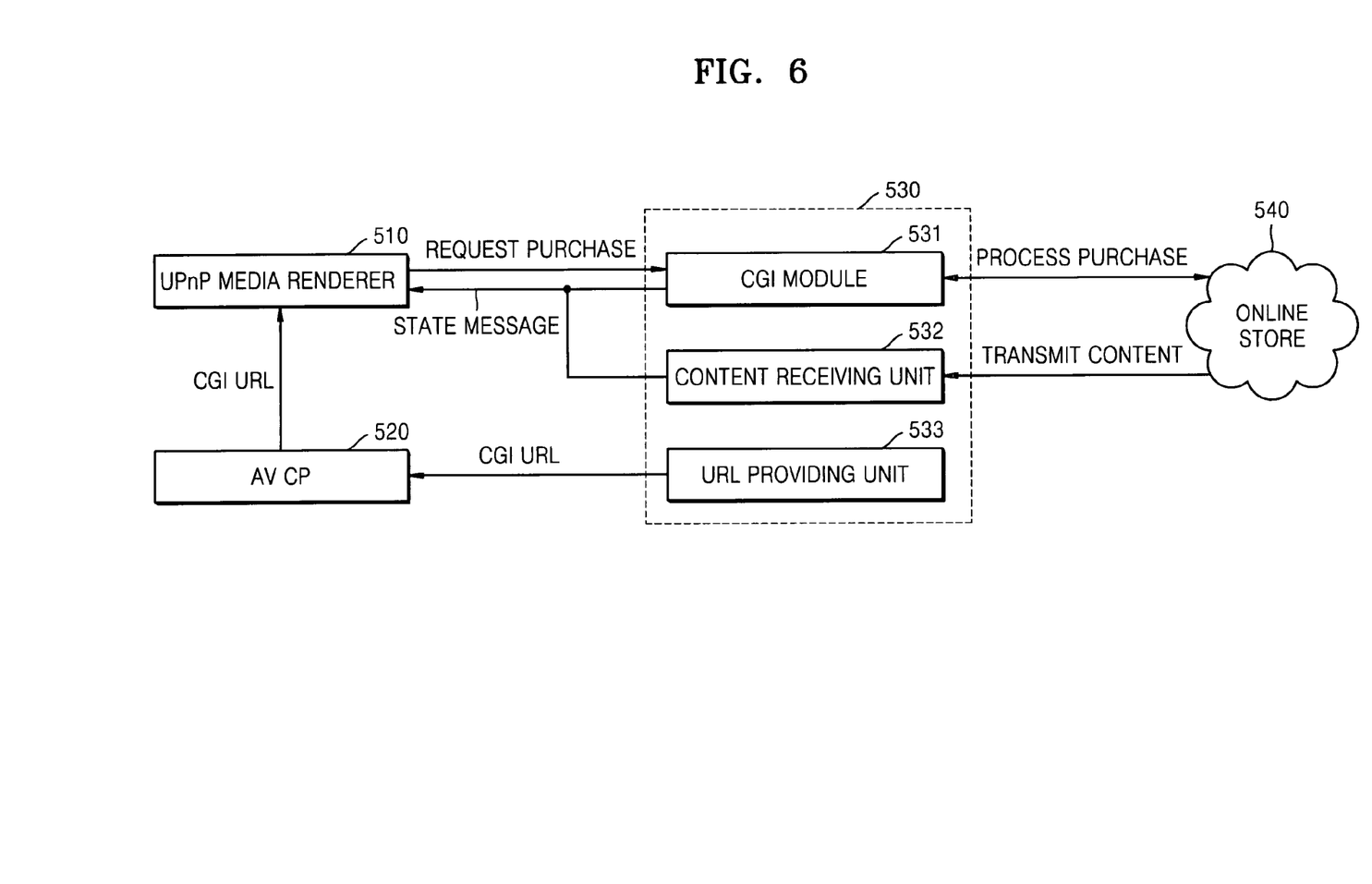
FIG. 6 is a block diagram of a UPnP MS according to an exemplary embodiment of the present invention.

FIG. 6 is a block diagram of a UPnP 530 MS according to an exemplary embodiment of the present invention. Referring to FIG. 6, the UPnP 530 comprises a CGI module 531, a content receiving unit 532, and a URL providing unit 533.

The URL providing unit 533 provides an AV CP 520 with charged content URLs that trigger CGIs to purchase each of the charged contents on sale by an online purchase site 540. The URLs are provided in response to a CDS::Browse( ) call, and may be included in a <res> tag of a response message. This will be described later.

The CGI module 531 stores CGIs that perform a process of purchasing the charged contents on sale by the online purchase site 540. If a UPnP MR 510 transmits an AVT::Play( ) call message including the URLs provided by the URL providing unit 533 to the AV CP 520 to the CGI module 531, the CGI module 531 analyzes the AVT::Play( ) call message as a purchase request and executes CGIs to purchase content corresponding to the AVT::Play( ) call message from the online purchase site 540. Reserved points may be used to pay for the content. Since another payment means can require a user's additional input, a user must use another home network device or define another UPnP message in order to pay for the content via a payment method other than using the reserved points. Therefore, if the CGI module 531 provides the online purchase site 540 with user information for authenticating membership and an ID of content to be purchased, the online purchase site 540 based on the user information authenticates the membership and determines whether to authorize the purchase of the content based on points reserved in a user's account. If the CGI module 531 fails to authenticate the membership or fails to purchase due to lack of reserved points, the CGI module 531 transmits a message indicating the failure to the UPnP MR 510.

The content receiving unit 532 downloads the content from the online purchase site 540 and stores the content if the purchase process is successfully completed. The content receiving unit 532 then transmits a message to the UPnP MR 510 indicating that downloading has started or ended.

Although not shown, the UPnP MS 530 can store the completely purchased content and transmit the same to the UPnP MR 510 if the UPnP MS 530 receives a request of transmission from the UPnP MR 510. However, the UPnP MS 530 can download the content from the online purchase site 540 and transmit the same to the UPnP MR 510 during streaming.

Figure 7:
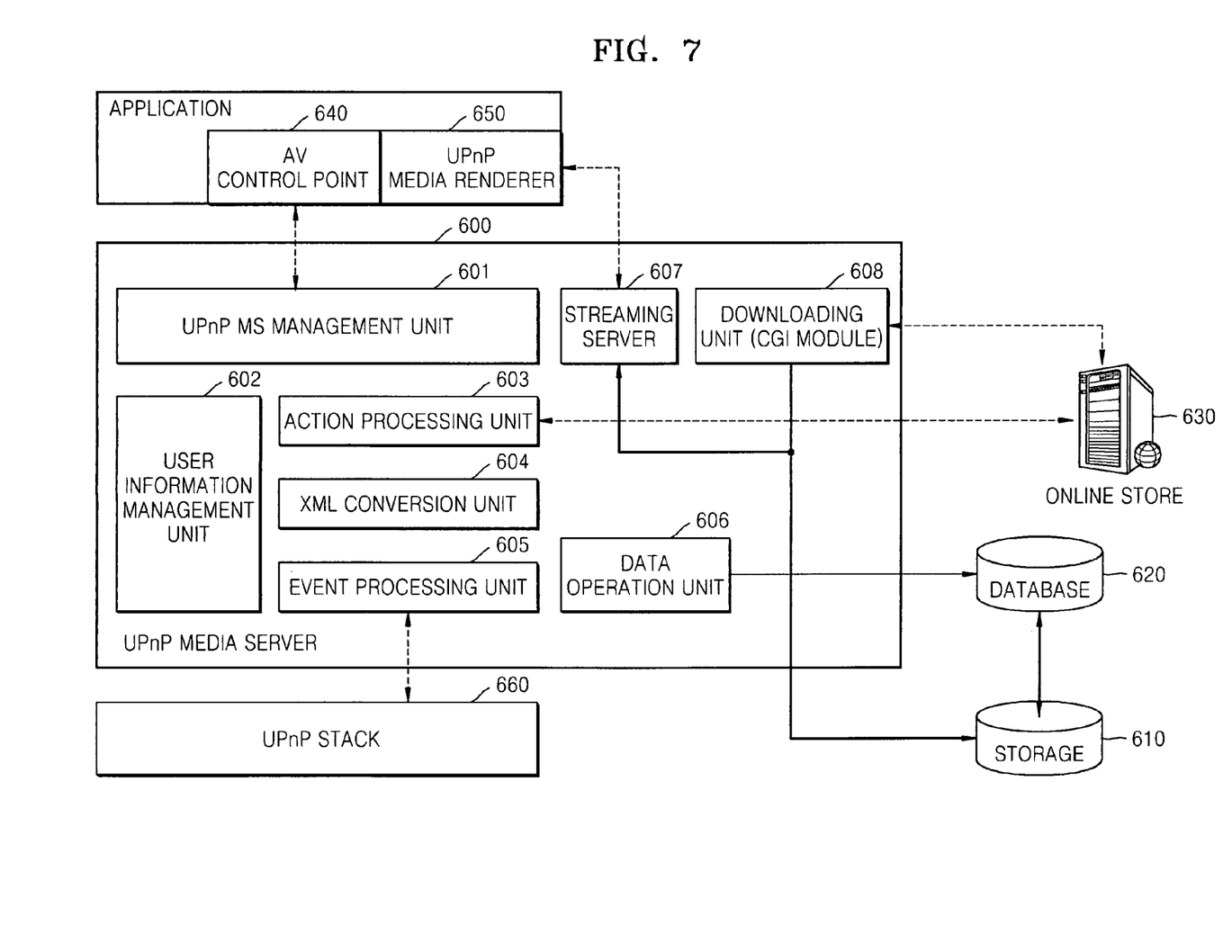
FIG. 7 is a block diagram of a UPnP MS according to another exemplary embodiment of the present invention.

FIG. 7 is a block diagram of a UPnP MS 600 according to another exemplary embodiment of the present invention. Referring to FIG. 7, the UPnP MS 600 comprises a UPnP MS management unit 601, a user information management unit 602, an action processing unit 603, an Extensible Markup Language (XML) conversion unit 604, an event processing unit 605, a data operation unit 606, a streaming server 607, and a downloading unit 608.

The UPnP MS management unit 601 provides an interface necessary for using services provided by UPnP MS software. An AV CP 640 can generate a UPnP MS management unit instance and call an interface provided by the action processing unit 603 in order to perform a task (e.g., content browsing, reproduction, etc.) requested by a user.

The action processing unit 603 controls subordinate modules so that actions defined by CDS, CMS, and AVT services provided by the UPnP MS 600 can be performed. The action processing unit 603 parses a Simple Object Access Protocol (SOAP) message described by UPnP actions transferred from the UPnP MS management unit 601 and calls the subordinate modules capable of processing each of the UPnP actions. The action processing unit 603 can request an external Internet site to transmit necessary information to perform the UPnP actions, and use a Web Service or a Vender-Defined protocol to request or receive the requested information.

A response to a Browse/Search action among actions of the CDS provided by the UPnP MS 600 is prepared in an XML document in the form of DIDL-Lite. The XML conversion unit 604 converts raw data obtained from the external Internet site or obtained from a Database Query in a home network into a DIDL-Lite XML document.

The event processing unit 605 processes an event message transferred from a UPnP Stack 660 and, when a State Variable managed by a UPnP CDS/CMS varies, transfers the varied State Variable to an AV CP 640 that subscribes an event corresponding to the event message.

The data operation unit 606 is a component that provides a consistent database access interface in order to access a variety of databases 620. Actions (e.g., browse, search, etc.) requiring database access can be processed using the interface provided by the data operation unit 606. Therefore, any kind of database 620 can be easily mounted in a system as long as the database 620 is compatible with an interface defined by the data operating unit 606.

The streaming sever 607 transmits contents stored in a storage 610 to a UPnP MR 650 in streaming format using a transmission protocol previously agreed upon via a CMS::GetProtocolInfo action provided by the UPnP MR 650.

The downloading unit 608 comprises a CGI module that purchases contents from the online purchase site 630 and downloads the contents. If the downloading unit 608 receives a contents purchase request from a UPnP MR via a user's input, the downloading unit 608 authenticates membership and generates a thread for downloading contents. The downloading unit 608 transmits download state data to inform a user of a contents downloading state to the streaming server 607.

The user information management unit 602 stores and manages user information and information necessary for purchasing contents. The user information management unit 602 can store a user's log-in ID, a password, an Internet site URL for purchasing the contents, etc.

Figure 8A:
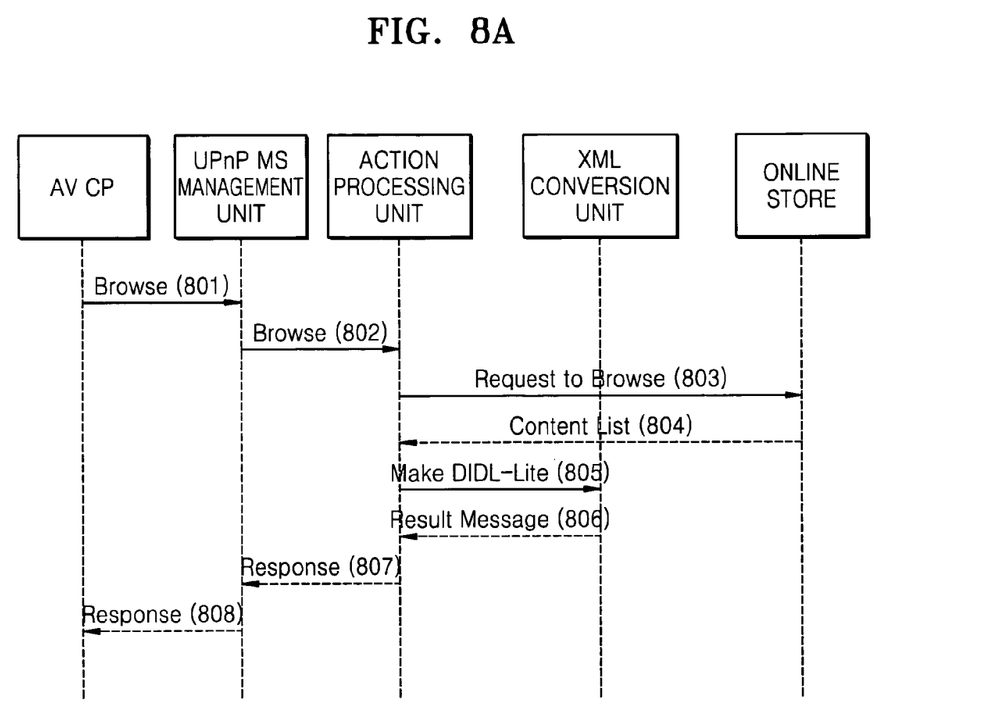
FIGS. 8A and 8B are diagrams for explaining a process of providing an audio visual control point with a content director service using the UPnP MS illustrated in FIG. 7.
Figure 8B:
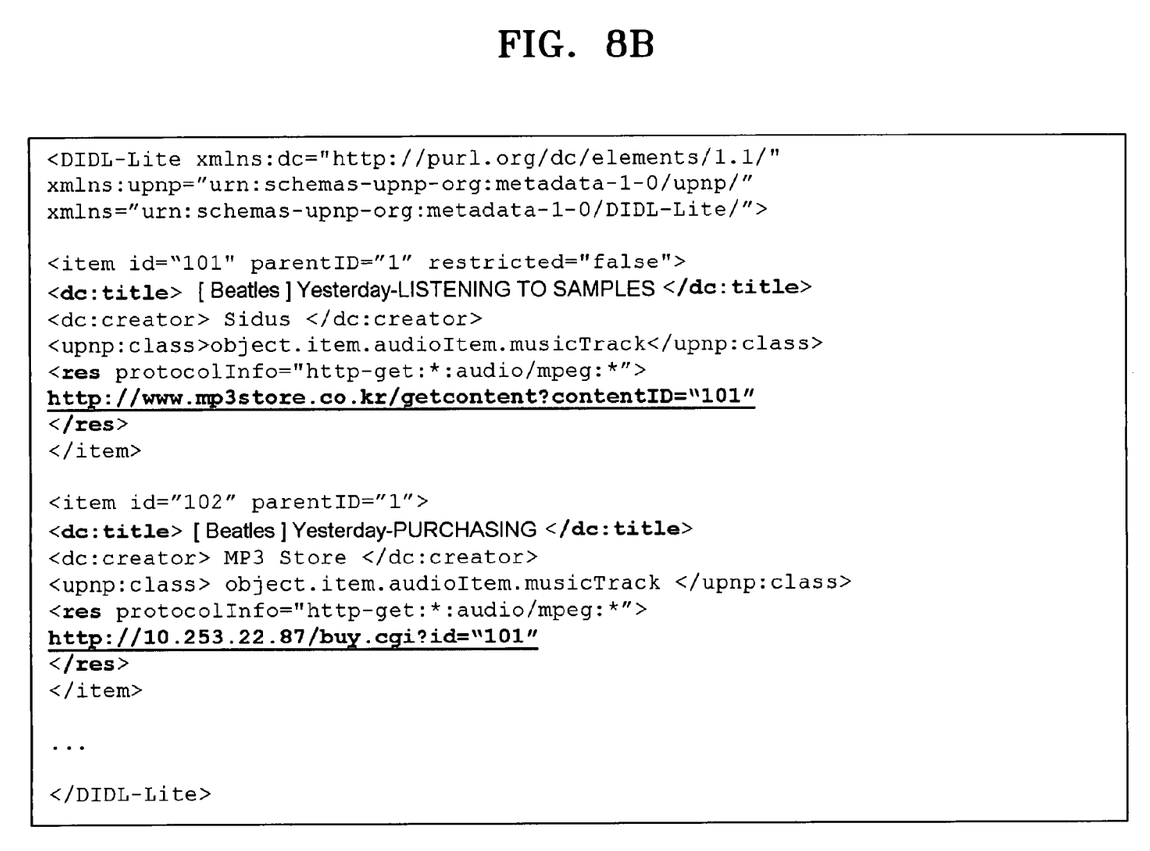

FIGS. 8A and 8B are diagrams for explaining a process of providing an AV CP with a CDS using the UPnP MS illustrated in FIG. 7. Referring to FIG. 8A, an AV CP mounted in a user application transmits a Browse action to the action processing unit through a UPnP MS management unit (Operations 801 and 802). The action processing unit parses a SOAP message called by the Browse action and requests an online purchase site to transmit a list of purchasable contents (Operation 803). The action processing unit that obtains the list of purchasable contents from the online purchasing site (Operation 804) converts the list of purchasable list into a format abiding by DIDL-Lite standards using an XML conversion unit (Operations 805, 806), and returns the converted XML message to the AV CP through the UPnP MS management unit (Operations 807 and 808).

Referring to FIG. 8B, an example of an XML response message abiding by the DIDL-Lite standards with regard to the Browse action expresses <listening to samples> and <purchasing> as single items. A <res> tag of the item <listening to samples> comprises a URL that allows a part of the contents to be appreciated. A <res> tag of the item <purchasing> comprises a URL that can trigger a CGI module to purchase contents. Since the <res> tag used in an existing UPnP response message comprises a URL necessary for purchasing contents, it is not necessary to define a separate UPnP message for purchasing contents.

Figure 9:
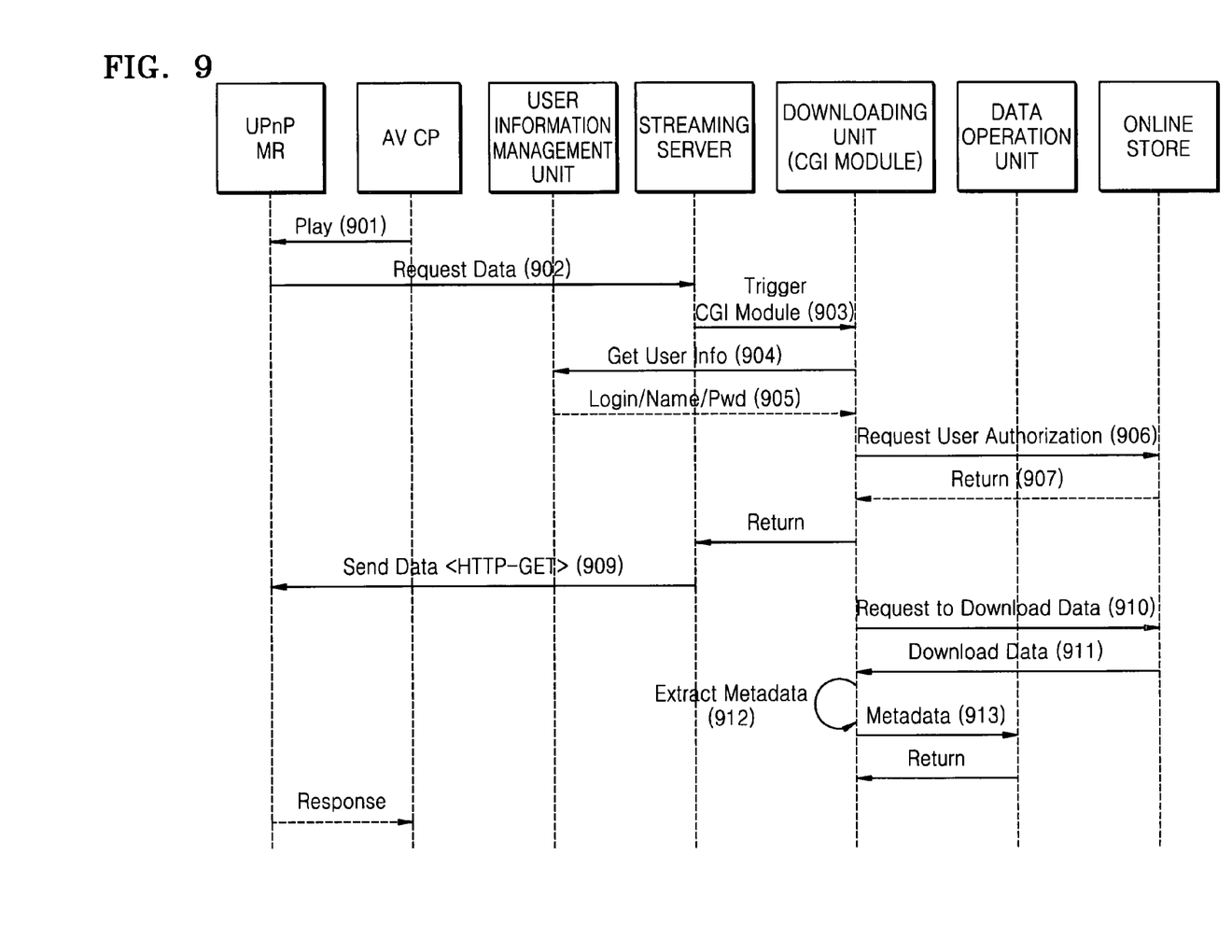
FIG. 9 is a flowchart illustrating a process of obtaining external charged content using the UPnP MS illustrated in FIG. 7.

FIG. 9 is a flowchart illustrating a process of obtaining external charged content using the UPnP MS illustrated in FIG. 7. Referring to FIG. 9, if a user selects an item <purchasing>, an AV control point requests a UPnP MR to perform a Play action (Operation 901). The UPnP MR requests the streaming server to transmit content corresponding to a specific URL in order to reproduce the content (Operation 902). A streaming server confirms the URL provided by the UPnP MR, determines whether the URL is a request for the reproduction of local content or a request for the purchase of the content, and, if it is the request for the purchase of the content, executes a content purchase CGI provided by a downloading unit (Operation 903). If the content purchase CGI is executed, the downloading unit obtains a user's log-in ID and password registered with a contents purchase site through a user information management unit (Operations 904, 905), and performs a user authentication process of an online purchase site using the user's log-in ID and the password (Operations 906, 907).

After the user authentication process is completed, the contents purchase site confirms remaining reserved points and returns a data server URL for downloading data. The content purchase site returns an error message when the content purchase CGI fails to perform the user authentication process or the remaining reserved points run short. When an error occurs, the streaming server transmits the error message in the format to be reproduced by the UPnP MR to the UPnP MR in order to inform the user that the error occurred. For example, the error message can be a voice message such as "reserved points run short" or "user information is not correct" in MP3 format.

If the user authentication process is successful and the remaining reserved points are sufficient, the downloading unit downloads content (Operations 910 and 911), transmits download state data downloaded with the installation of the UPnP MS to the streaming server (Operation 908), and the streaming server transmits the download state data to the UPnP MR (Operation 909). For example, the download state data can be various formats of data indicating messages such as "downloading is starting", "downloading is proceeding", etc., which must be reproduced by the UPnP MR.

The UPnP MS transmits the error message or the download state data to the UPnP MR in order to inform a user of a contents purchase state using a protocol (e.g., HTTP-GET, IEEE 1394, etc.) previously agreed upon between the UPnP MS and the UPnP MR.

If the purchased content is completely downloaded, the downloading unit extracts metadata from the purchased content (Operation 912), and stores the metadata in a database by using a data operation unit (Operation 913). Therefore, the purchased content can be indicated as local content with regard to a CDS::Browse( ) call.

Figure 10:
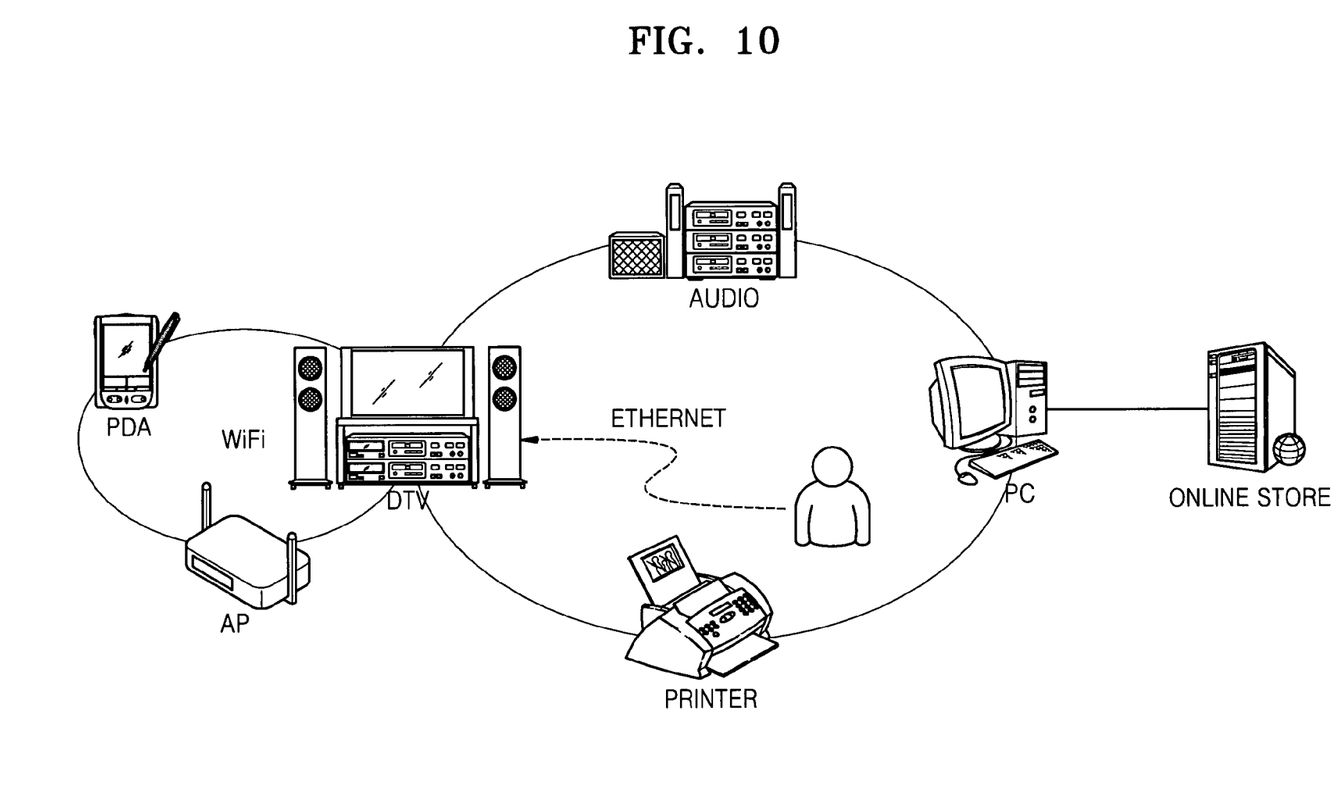
FIG. 10 is a diagram of a home network when a UPnP MS is realized in a PC according to an exemplary embodiment of the present invention.
Figure 12A:
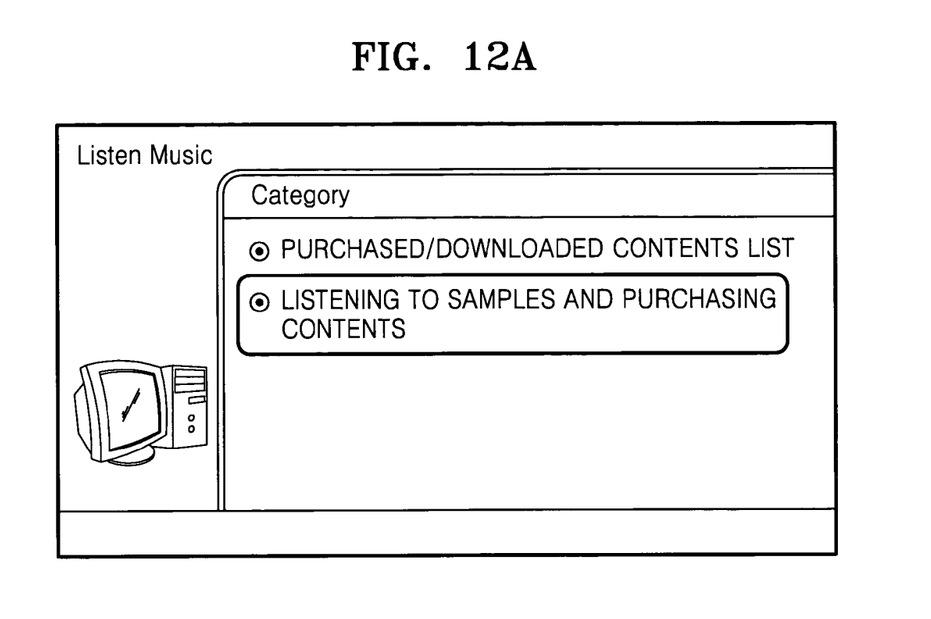
FIGS. 12A and 12B are photos showing user interfaces provided to a UPnP media renderer (MR) when a UPnP MS is used in a home network according to an exemplary embodiment of the present invention.
Figure 12B:
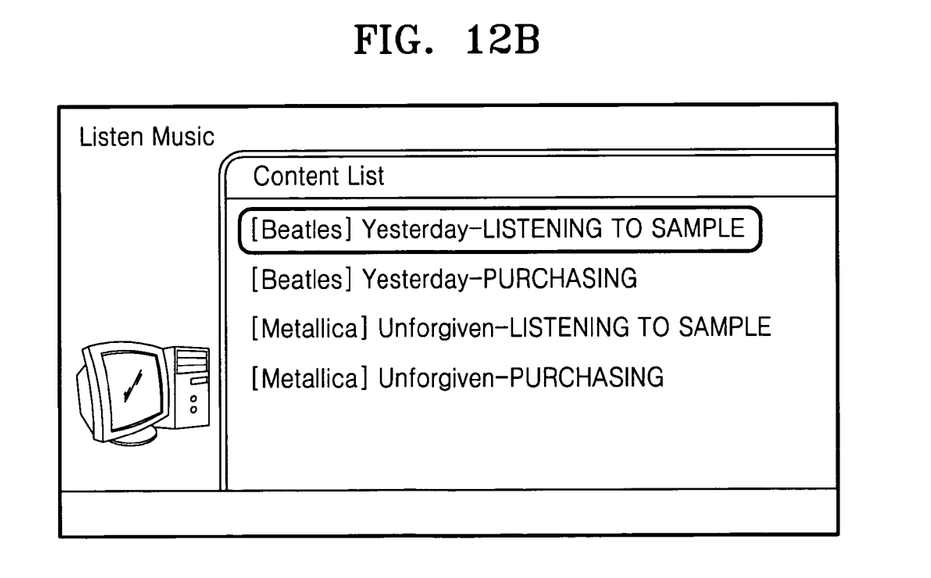

FIG. 10 is a diagram of a home network when a UPnP MS is realized in a PC according to an exemplary embodiment of the present invention. Referring to FIG. 10, the Ethernet-based home network comprises a digital TV (DTV) in which an AV CP is mounted, an audio device in which a UPnP MR is mounted, and the PC in which the UPnP MS is mounted. A user selects a menu <listening to and purchasing samples> through the DTV having a user interface, as illustrated in FIG. 12A, to confirm a list of contents to be purchased from an online purchase site, and selects each item of a list of contents, as illustrated in FIG. 12B, to listen to a sample of a content or purchase the content. Successfully purchased content is stored in a download directory designated with the installation of UPnP MS software. After the purchased content is completely downloaded, the user selects from a <a purchased/downloaded contents list> as shown in FIG. 12A, and reproduces a selected content.

Figure 11:
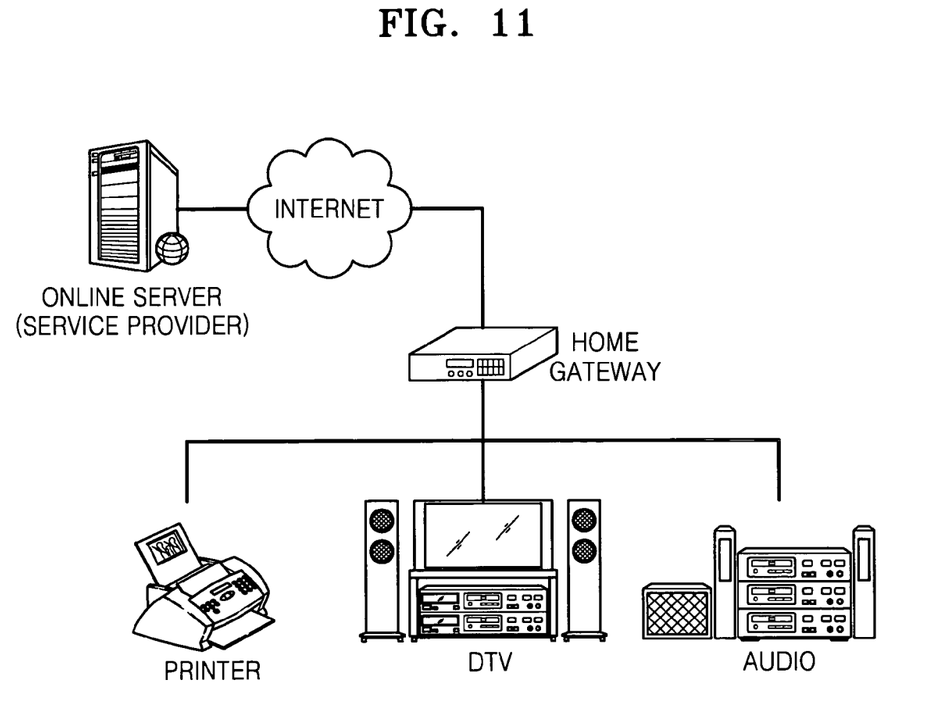
FIG. 11 is a diagram of a home network when a UPnP MS is realized in a home gateway according to an exemplary embodiment of the present invention.

FIG. 11 is a diagram of a home network when a UPnP MS is realized in a home gateway according to an exemplary embodiment of the present invention. Referring to FIG. 11, the UPnP MS is installed in a bundle in a home gateway in which an Open Service Gateway initiative (OSGi) is mounted. The UPnP service bundle is basically installed in an OSGi platform. Consumer electronics devices of the home network are controlled using an Ethernet-based UPnP protocol. A user calls a Browse action provided by the UPnP MS installed in the OSGi platform using a UPnP AV CP mounted in a DTV in order to browse a list of contents provided by an external service provider, and purchases a desired content by interworking with the UPnP MR mounted in an audio device that is a rendering device in a home network.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

According to the present invention, in a UPnP based home network, a user can browse a list of contents provided by an external contents purchase site through a CE device such as a DTV in which a UPnP AV control point is mounted without a separate interface, purchase a desired content, and reproduce the purchased content. Also, the user is not required to separately define a UPnP message in order to purchase content, and thereby can purchase a charged content from the external content purchase site in a UPnP MS without any modification of an existing UPnP MR or the UPnP AV control point.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method for a content directory server (CDS) to provide content in a Universal Plug and Play (UPnP) network, the method comprising:
    storing a user's log-in ID and password in a user information management unit section of the CDS;
    receiving, by the CDS, a first request for content from a control point;
    transmitting, by the CDS, at least a first uniform resource locator (URL) and a second URL associated with the content, wherein the first URL comprises a URL for a common gate interface (CGI), and the second URL comprises a content sample URL;
    receiving, by the CDS, a second request for the content comprising one of the first URL and the second URL from a media rendering device;
    determining, by the CDS, based on the URL of the second request for the content, whether the content is stored in the CDS; and
    based on the determining, performing, by the media server, steps comprising:
        executing the CGI of the URL of the second request for the content;
        obtaining the user's log-in ID and password from the user information management unit section;
        performing an authentication at a content purchase site using the log-in and password, and
        receiving the content from the content purchase site and transmitting the content to the media rendering device.

2. The method of claim 1, wherein the URL is included in a tag of the response message.

3. The method of claim 1, wherein, in the performing the process of purchasing the charged content, user information for authenticating membership of a user is transmitted to the external server to pay for the charged content using reserved points of the user.

4. The method of claim 1, wherein the receiving the purchased charged content comprises transmitting a message indicating a receipt procedure of the charged content to the media renderer,
    wherein the message has a format to be reproduced by the media renderer.

5. The method of claim 1, further comprising if the performing the process of purchasing the charged content cannot be carried out, transmitting an error message to the media renderer,
    wherein the error message has a format to be reproduced by the media renderer.

6. A non-transitory computer readable recording medium having embodied thereon computer program instructions that when executed by a content directory server (CDS), cause the CDS to perform a method comprising:
    storing a user's log-in ID and password in a user information management unit section of the CDS;
    receiving, by the CDS, a first request for content from a control point;
    transmitting, by the CDS, at least a first uniform resource locator (URL) and a second URL associated with the content, wherein the first URL comprises a URL for a common gate interface (CGI), and the second URL comprises a content sample URL;
    receiving, by the CDS, a second request for the content comprising one of the first URL and the second URL from a media rendering device;
    determining, by the CDS, based on the URL of the second request for the content, whether the content is stored in the CDS;
    based on the determining, performing, by the media server, steps comprising:
        executing the CGI of the URL of the second request for the content;
        obtaining the user's log-in ID and password from the user information management unit section;
        performing an authentication at a content purchase site using the log-in and password, and
        receiving the content from the content purchase site and transmitting the content to the media rendering device.

7. An apparatus for obtaining an external content in a Universal Plug and Play network, the apparatus comprising:
    a common gate interface module which performs a process of purchasing charged content existing in an external server using a common gate interface based on a request from a media renderer to transmit the charged content; and
    a content receiver which receives the charged content which is purchased from the external server.

8. The apparatus of claim 7, further comprising: a uniform resource locator (URL) providing unit which provides a control point with a URL that triggers the common gate interface,
    wherein the common gate interface module receives a call message including the URL from the media renderer as the request for transmission of the charged content.

9. The apparatus of claim 8, wherein the URL providing unit provides the URL included in a response message to the control point in response to a call of the control point.

10. The apparatus of claim 9, wherein the URL is included in a tag of the response message.

11. The apparatus of claim 7, wherein the common gate interface module transmits a user information for authenticating membership of a user to the external server in order to pay for the charged content using reserved points of the user.

12. The apparatus of claim 7, wherein the content receiving unit transmits a message indicating a receipt procedure of the charged content to the media renderer, wherein the message has a format to be reproduced by the media renderer.

13. The apparatus of claim 7, wherein if the common gate interface module cannot perform the process of purchasing the charged content, the common gate interface module transmits an error message to the media renderer,
    wherein the error message has a format to be reproduced by the media renderer.

* * * * *